Patented Dec. 30, 1952

2,623,818

UNITED STATES PATENT OFFICE 2,623,818

CONTROL OF CORROSION IN NITRO-PHENOLIC COMPOSITIONS

William J. Hanson, Long Beach, and Robert W. Nex, Bellflower, Calif., assignors to The Dow Chemical Company, Midland, Mich., a corporation of Delaware No Drawing. Application October 1, 1951, Serial No. 249,212

7 Claims. (Cl. 71—2.5)

This invention is concerned with corrosion inhibition and is particularly directed to an inhibited composition comprising a 2,4-dinitro-6-alkyl-phenol dissolved in an aromatic oil, and to a method for preventing the corrosion of black iron in contact with a solution of 2,4-dinitro-6-alkyl-phenol in aromatic oils.

The 2,4-dinitro-6-alkyl-phenols with which the present invention is concerned are those having the formula

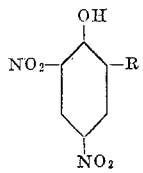

wherein R represents an alkyl radical containing from 3 to 5 carbon atoms, inclusive. These compounds are crystalline solids, somewhat soluble in many organic solvents.

The specified dinitrophenols are currently employed as the active ingredients in agricultural spray compositions applied for the killing of insect and mite pests and for both selective and general control of undesired vegetation. In such use the dinitro-phenols are commonly formulated as solutions in aromatic oils, such solutions being adapted for subsequent dilution with additional oil carrier or dispersion in water to produce oil-water emulsions. Among the problems attendant such operation has been the marked tendency of both the oily concentrates and dilutions to corrode black iron. This is a major difficulty both in the distribution and application of the products, since the concentrates would normally be handled in tank cars or drums, and the diluted compositions contact the surfaces of spray equipment and tanks which are readily subject to corrosion. Fences, metal rails and posts, tower installations and the like also may be caused to pit and rust unless precautions are taken to avoid contact with the dinitrophenol formulations as applied. In spite of these difficulties, the dinitrophenols are being widely employed in weed and parasite control programs, and their utility makes essential the provision of means for controlling the corrosion problem.

It is among the objects of the present invention to provide means for minimizing the corrosion of metal surfaces by oily compositions comprising the dinitro-alkyl-phenols in aromatic oils. A further object is to supply such composition containing an additament serving as a corrosion inhibitor. Still another object is to provide a method whereby the corrosive action of oily solutions of the dinitro-alkyl-phenol is largely controlled. Other objects will become evident from the following specification and claims.

It has now been discovered that the corrosion of black iron by oily dispersions of the 2,4-dinitro-6-alkyl-phenols and particularly solutions or dispersions therein in aromatic liquids and solvents and in oil-water emulsions is inhibited by incorporating furfural in the dinitrophenolic composition. This additament does not serve as an emulsifying and dispersing agent and, where it is desired that the composition be adapted subsequently to be dispersed in water, the inclusion of conventional wetting and emulsifying agents is necessary.

The furfural employed may be either the pure compound or a technical grade, the latter being at least as effective as the chemically pure material.

The aromatic liquid and solvent employed may be any suitable organic liquid consisting predominately of aromatic organic compounds and inclusive of the so-called aromatic petroleum oils, xylene, benzene, toluene, cumene, trichlorobenzene, and the like provided only that such material exhibit solvent properties for the 2,4-dinitro-6-alkyl-phenol. A representative aromatic petroleum oil is that marketed as Shell E-407 oil. This product has a specific gravity of 0.8956 at 60° F., a Saybolt color rating of 20, a flash point (tag closed cup) of 106° F., a mixed aniline point of 27.6° C., and a boiling range of from 376° F. initial to 500° F. end point. The oil is from 75 to 85 percent aromatic in nature.

The amount of furfural required to accomplish the desired result of corrosion control varies with the exact nature of the ultimate composition. In general, from about 0.8 to 3 per cent by weight of furfural is employed based upon the combined weights of the dinitroalkyl-phenol and aromatic oil in the composition. Good results are obtained with from about 1 to 1.5 percent by weight of the furfural.

Wetting and dispersing agents adapted to be employed in the composition are preferably those of the non-ionic type such as the long chain alkyl sulfates and their salts, sorbitan ester derivatives of polyalkylene structures, oil soluble oleates, aryloxy polyalkylene oxides, and alkylated aryl polyether alcohols.

The following examples illustrate the invention but are not to be construed as limiting.

EXAMPLE 1

A herbicide composition was prepared comprising 2,4-dinitro-6-secondary butyl-phenol as the active toxic ingredient and having the following percentage composition:

| | Per cent by weight |
|---|---|
| 2,4-dinitro-6-secondary butyl-phenol | 58.5 |
| Toluene | 29.5 |
| Oleic acid esters of polyethylene glycols (Trem 014) | 11.0 |
| Furfural | 1.0 |

The composition had a specific gravity of 1.095 at 20°/20° C. and a flash point (C. O. C.) of approximately 80° F. It was a free flowing liquid at room temperature. It is hereinafter designated as composition A.

An exactly similar composition was produced by substituting a commercially available alkylated aryl polyether alcohol (Triton X-100) for the oleic acid ester employed above. This mixture is hereinafter termed as composition B and has the following percentage composition:

| | Per cent by weight |
|---|---|
| 2,4-dinitro-6-secondary butyl-phenol | 58.5 |
| Toluene | 29.5 |
| Alkylated aryl polyether alcohol (Triton X-100) | 11.0 |
| Furfural | 1.0 |

A third mixture hereinafter referred to as composition C was employed as a check and was as follows:

| | Per cent by weight |
|---|---|
| 2,4-dinitro-6-secondary butyl-phenol | 58.5 |
| Oleic acid esters of polyethylene glycols (Trem 014) | 11.0 |
| Toluene | 30.5 |

Compositions A, B and C were tested to determine their comparative corrosive action against black iron. It was found that on storage for a number of months in black iron drums, compositions A and B had no apparent effect upon the interior of the drums. Composition C attacked the interior of the drums to such an extent that the containers developed leaks at and about the seams with resultant loss of material and contamination of the products with precipitated iron salts in the form of a dark insoluble sludge.

EXAMPLE 2

In controlled laboratory operations, portions of compositions A, B and C from Example 1 and a composition D consisting of 58.5 parts by weight of 2,4-dinitro-6-secondary butyl-phenol in 30.5 parts by weight of toluene, were placed in glass containers and black iron test strips partially immersed in each composition. In one series of determinations, each composition was modified by the inclusion of a small amount of water prior to the introduction of the test strips. The following table sets forth the results obtained at 75° F.

TABLE I

| Composition | Water Present | Months of Storage | Corrosion or Iron |
|---|---|---|---|
| A | no | 19 | none. |
| A | yes | 19 | Do. |
| B | no | 17 | slight. |
| B | yes | 17 | Do. |
| C | no | 4 | heavy. |
| C | yes | 4 | appreciable. |
| D | no | 3 days | yes. |
| D | yes | do | Do. |

EXAMPLE 3

Compositions A, C, and D as described above were contacted with black iron strips in an accelerated determination carried out at a temperature of 168° F. The following table sets forth the results obtained.

TABLE II

| Composition | Days of Storage | Corrosion of Iron |
|---|---|---|
| A | 9 | no corrosion. |
| C | 3 | definite corrosion. |
| D | 3 | Do. |

EXAMPLE 4

Other compositions exhibiting reduced corrosion properties against black iron include the following:

*Composition E*

| | Per cent by weight |
|---|---|
| 2,4-dinitro-6-secondary amyl-phenol | 40.0 |
| Xylene | 38.0 |
| Sorbitan esters of polyethylene oxide | 10.0 |
| Furfural | 2.0 |

*Composition F*

| | Per cent by weight |
|---|---|
| 2,4-dinitro-6-secondary armyl-phenol | 40.0 |
| Aromatic oil (Shell E-407) | 49.2 |
| Oleic acid esters of polyethylene glycols | 10.0 |
| Furfural | 0.8 |

*Composition G*

| | Per cent by weight |
|---|---|
| 2,4-dinitro-6-normal butyl-phenol | 53.5 |
| Alkylated aryl polyether alcohol | 11.5 |
| Benzene | 34.0 |
| Furfural | 1.0 |

We claim:

1. A composition of matter comprising an aromatic solvent oil, and dissolved in the solvent oil (1) a 2,4-dinitro-6-alkyl-phenol of the formula

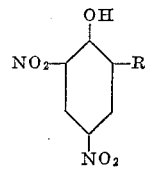

wherein R represents an alkyl radical containing from 3 to 5 carbon atoms, inclusive, and (2) furfural as a corrosion inhibitor.

2. A composition according to claim 1, containing from 0.8 to 3 per cent by weight of furfural based on the combined weight of the aromatic oil and 2,4-dinitro-6-alkyl-phenol.

3. A composition according to claim 1 in which the 2,4-dinitro-6-alkyl-phenol is 2,4-dinitro-6-secondary butyl-phenol.

4. A composition of matter comprising a solution in an aromatic solvent oil of (1) a non-ionic emulsifying and dispersing agent (2) a 2,4-dinitro-6-alkyl-phenol of the formula

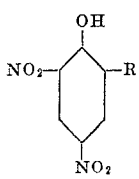

wherein R represents an alkyl radical containing from 3 to 5 carbon atoms, inclusive, and (3) furfural as a corrosion inhibitor.

5. A composition of matter comprising a solution in an aromatic solvent oil of 2,4-dinitro-6-secondary butyl-phenol, and as a corrosion inhibitor therefor from 0.8 to 3 per cent by weight of furfural based on the combined weight of aromatic oil and 2,4-dinitro-6-secondary butyl-phenol.

6. A method for minimizing the corrosive action against black iron of aromatic solvent oil solutions of 2,4-dinitro-6-alkyl-phenols of the formula

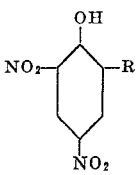

wherein R represents an alkyl radical containing from 3 to 5 carbon atoms, inclusive, which comprises the step of dispersing therein from 0.8 to 3 per cent by weight of furfural based upon the combined weights of the aromatic solvent oil and 2,4-dinitro-6-alkyl-phenol.

7. A method according to claim 6 wherein the 2,4-dinitro-6-alkyl-phenol is 2,4-dinitro-6-secondary butyl-phenol.

WILLIAM J. HANSON.
ROBERT W. NEX.

REFERENCES CITED

The following references are of record in the file of this patent:

UNITED STATES PATENTS

| Number | Name | Date |
|---|---|---|
| 2,007,433 | Melhus | July 9, 1935 |
| 2,392,859 | Meuli | Jan. 15, 1946 |